United States Patent

Syed

(10) Patent No.: US 10,452,597 B2
(45) Date of Patent: Oct. 22, 2019

(54) UNIFIED COMMUNICATION OF COMPUTER PERIPHERALS

(71) Applicant: Corsair Memory, Inc., Fremont, CA (US)

(72) Inventor: Taniyyus Syed, Fremont, CA (US)

(73) Assignee: Corsair Memory, Inc.

(*) Notice: Subject to any disclaimer, the term of this patent is extended or adjusted under 35 U.S.C. 154(b) by 0 days.

(21) Appl. No.: 15/291,262

(22) Filed: Oct. 12, 2016

(65) Prior Publication Data

US 2017/0103038 A1    Apr. 13, 2017

(51) Int. Cl.
*G06F 13/42* (2006.01)
*G06F 13/40* (2006.01)

(52) U.S. Cl.
CPC ...... *G06F 13/4282* (2013.01); *G06F 13/4022* (2013.01)

(58) Field of Classification Search
CPC ...... G06F 3/0482; G06F 3/038; G06F 3/0485; G06F 3/04883
USPC .............................. 710/2; 345/156, 163, 168
See application file for complete search history.

(56) References Cited

U.S. PATENT DOCUMENTS

| | | | | |
|---|---|---|---|---|
| 5,675,813 A | * | 10/1997 | Holmdahl | G06F 1/3215 710/8 |
| 6,804,727 B1 | * | 10/2004 | Rademacher | G06F 3/1204 710/305 |
| 7,574,532 B2 | * | 8/2009 | Wang | H04N 1/00204 710/62 |
| 10,114,769 B2 | * | 10/2018 | Plancherel | G06F 9/52 |
| 2004/0075647 A1 | * | 4/2004 | Bean | G06F 3/0238 345/168 |
| 2006/0245097 A1 | * | 11/2006 | Chang | G08C 23/04 360/1 |
| 2007/0217598 A1 | * | 9/2007 | Ferguson | H04M 1/6033 379/350 |
| 2008/0055239 A1 | * | 3/2008 | Garibaldi | G06F 3/0481 345/156 |
| 2010/0079309 A1 | * | 4/2010 | Filson | G06F 3/0219 341/20 |
| 2012/0191894 A1 | * | 7/2012 | Sasaki | G06F 13/387 710/313 |
| 2012/0223820 A1 | * | 9/2012 | Park | G05B 15/02 340/12.52 |
| 2012/0254486 A1 | * | 10/2012 | Tausher | G06F 1/266 710/63 |
| 2013/0067126 A1 | * | 3/2013 | Casparian | G06F 3/0219 710/73 |
| 2013/0145061 A1 | * | 6/2013 | Parivar | G06F 9/454 710/67 |
| 2015/0195687 A1 | * | 7/2015 | Alansky | H04W 4/10 455/518 |

* cited by examiner

*Primary Examiner* — Faisal M Zaman
(74) *Attorney, Agent, or Firm* — Carina Tan

(57) ABSTRACT

A unified communication platform for computer peripherals enables one peripheral device of a plurality of devices to communicate and control one or more of the other peripheral devices of the plurality of devices, wherein the plurality of devices are associated with a host device, according to certain embodiments.

10 Claims, 11 Drawing Sheets

UNIFIED COMMUNICATION OF COMPUTER PERIPHERALS

CROSS-REFERENCE TO RELATED APPLICATIONS

The present application claims the benefit of U.S. Provisional Patent Application Ser. No. 62/240,308, filed Oct. 12, 2015 and entitled "Unified Communication of Computer Peripherals," which is hereby incorporated by reference in its entirety.

TECHNICAL FIELD

The present invention is directed to communication and control between computer peripherals.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Figure 1:
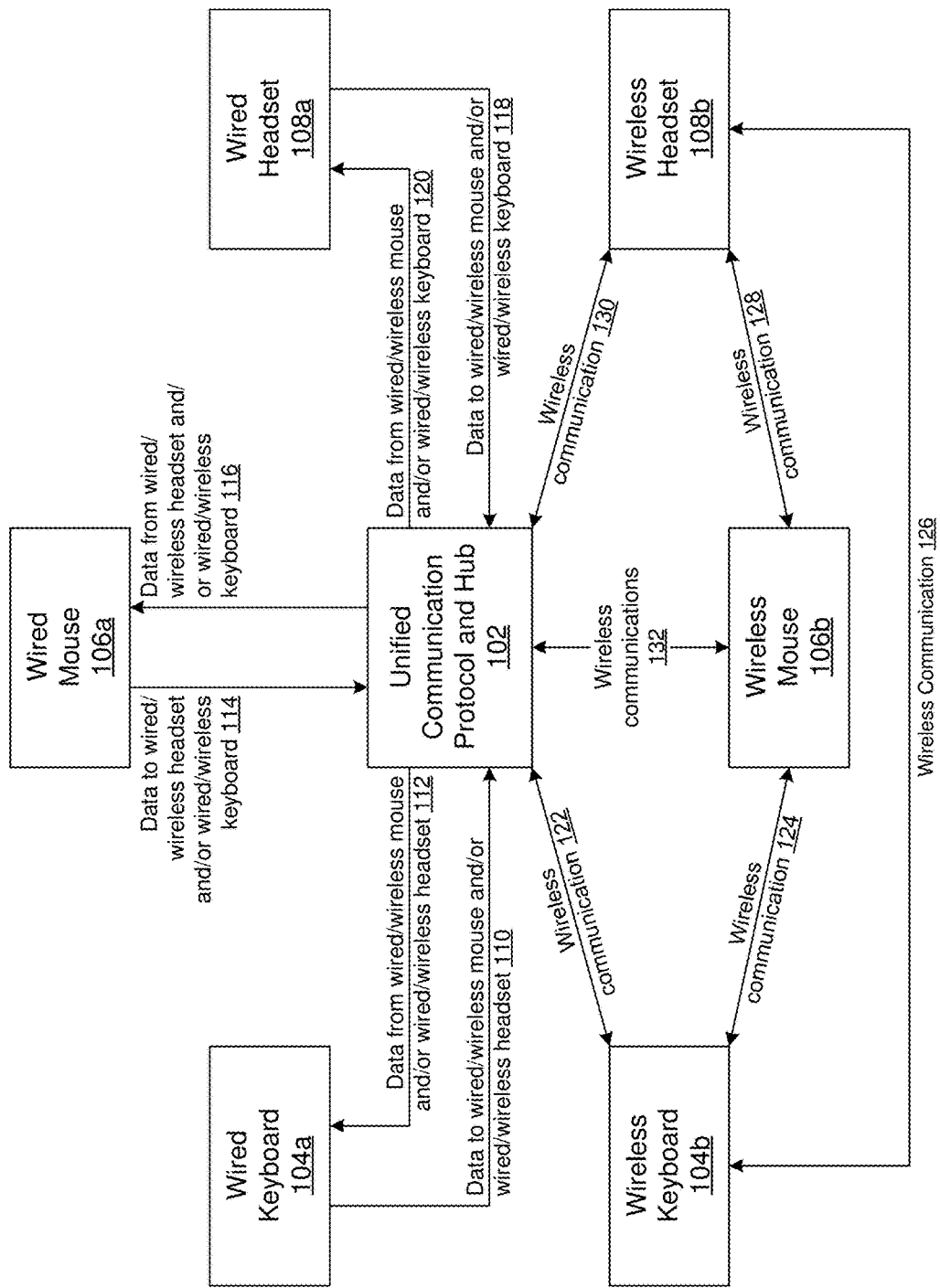
FIG. 1 illustrates a high-level communication diagram of a unified communication platform, according to certain embodiments.

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

According to certain embodiments, a unified communication platform for computer peripherals enables one peripheral device of a plurality of devices to communicate and control one or more of the other peripheral devices of the plurality of devices, wherein the plurality of devices are associated with a host device. Non-limiting examples of host devices include personal computers (PCs), tablets, smartphones, hand held devices, computer workstations, etc.

According to certain embodiments, the unified communication platform allows one peripheral device to adjust and/or change and/or multiplex one or more functions/actions and features of one or more of the other peripheral devices either over a wired connection or a wireless connection.

According to certain embodiments, the unified communication platform uses USB communication protocols.

According to certain embodiments, the unified communication platform enables the assignment of control of one or more headset functions/actions to any key or keys and/or any combination of keys on a keyboard and/or on a mouse.

According to certain embodiments, the unified communication platform enables the assignment of control of one or more keyboard functions/actions, including any macros, and/or any lighting effects that are already linked to keys on the keyboard to any key or keys and/or any combination of keys on a mouse and/or on a headset.

According to certain embodiments, the unified communication platform enables the assignment of control of one or more mouse functions/actions, including any macros, and/or any lighting effects that are already linked to keys on the mouse to any key or keys and/or any combination of keys on a headset and/or on a keyboard.

According to certain embodiments, the unified communication platform includes a communication protocol/hub capable of remapping (reassigning) controls, lighting effects, actions, functions, macros, of one or multiple devices to one or multiple devices. For example, such remapping can be any one or a combination of: one-to-one mapping, one-to-many mapping, many-to-one mapping, and many-to-many mapping.

According to certain embodiments, the unified communication platform allows wireless peripherals that are associated with the unified communication platform to communicate wirelessly with each other.

As non-limiting examples, the unified communication platform enables the user to remap (reassign) one or more of the following functions of one device to another device:
1. Headset Actions:
   Microphone On
   Microphone Off
   Mic Toggle
   Set Microphone level
   Sidetone On
   Sidetone Off Set Sidetone level
Surround Sound On
Surround Sound Off
EQ 1 (equalizer level 1)
EQ 2, (equalizer level 2) etc.
Volume Up
Volume Down
Set Volume level
Power On
Power Off
Auto Shut Down On
Auto Shut Down Off
Standby
RGB LED Pattern Enabled
RGB LED Pattern Disabled
Customize RGB LED Pattern
2. Mouse Actions:
Left click
Right click
Middle click
Sniper button
DPI (dots per inch) Up
DPI Down
Set DPI level
Scroll Up
Scroll Down
Trigger button (any)
MMO (massively multiplayer online) keys
3. Keyboard Actions:
Trigger standard key action
Trigger a customized key action
Trigger a macro
Trigger customized text
Shortcut key to a program or file
Trigger a button press
Trigger a button press and hold
Trigger a button release According to certain embodiments, when a user interacts with a peripheral device of a set of peripheral devices that are associated with the unified communication platform, such a peripheral device includes firmware and/or software that detects such user interaction as a user-generated event. The peripheral device's firmware/software reports the user-generated event to the unified communication protocol/hub. According to certain embodiments, the unified communication protocol/hub reacts to the reported user-generated event by triggering one or more pre-defined actions on one or more devices (e.g., computer peripheral devices such as a mouse, headset and keyboard, other input/output devices, and human-interface-devices) that are associated with the unified communication platform. According to certain embodiments, a peripheral device of the set of peripheral devices associated with the unified communication platform is configured to detect system-generated events as well. The peripheral device reports the detected system-generated event to the unified communication protocol/hub. According to certain embodiments, the unified communication protocol/hub reacts to the reported system-generated event by triggering one or more pre-defined actions on one or more devices.

FIG. 1 illustrates a high-level communication diagram of a unified communication platform, according to certain embodiments. In FIG. 1, a unified communication platform 100 comprises a unified communication protocol/hub 102 that communicates with computer peripherals that are associated with unified communication protocol/hub 102. Computer peripherals that are associated with unified communication protocol/hub 102 can include, as non-limiting examples, a wired keyboard 104a, a wireless keyboard 104b, a wired mouse 106a, a wireless mouse 106b, a wired headset 108a, and a wireless headset 108b, according to certain embodiments.

For example, at a given time, a user may decide to select for use:
either wired keyboard 104a or wireless keyboard 104b; and
either wired mouse 106a or wireless mouse 106b; and
either wired headset 108a or wireless headset 108b.

Once the user has selected the peripheral devices for use, the user can proceed to remap one or more functions of the selected peripheral devices using unified communication protocol/hub 102, if so desired, according to certain embodiments. FIG. 1 shows that wired keyboard 104a can send information through communication 110 via unified communication protocol/hub 102 to wired mouse 106a or to wireless mouse 106b, depending on which peripheral devices the user selected for impending use. Similarly, wired keyboard 104a can send information through communication 110 via unified communication protocol/hub 102 to wired headset 108a or to wireless headset 108b, depending on which peripheral devices the user selected.

Wired keyboard 104a can also receive information through communication 112 via unified communication protocol/hub 102 from wired mouse 106a or from wireless mouse 106b, depending on which peripheral devices the user selected for impending use. Similarly, wired keyboard 104a can receive information through communication 112 via unified communication protocol/hub 102 from wired headset 108a or from wireless headset 108b, depending on which peripheral devices the user selected.

Wired mouse 106a can send information through communication 114 via unified communication protocol/hub 102 to wired keyboard 104a or to wireless keyboard 104b, depending on which peripheral devices the user selected for impending use. Similarly, wired mouse 106a can send information through communication 114 via unified communication protocol/hub 102 to wired headset 108a or to wireless headset 108b, depending on which peripheral devices the user selected.

Wired mouse 106a can also receive information through communication 116 via unified communication protocol/hub 102 from wired keyboard 104a or from wireless keyboard 104b, depending on which peripheral devices the user selected for impending use. Similarly, wired mouse 106a can receive information through communication 116 via unified communication protocol/hub 102 from wired headset 108a or from wireless headset 108b, depending on which peripheral devices the user selected.

Wired headset 108a can send information through communication 118 via unified communication protocol/hub 102 to wired mouse 106a or to wireless mouse 106b, depending on which peripheral devices the user selected for impending use. Similarly, wired headset 108a can send information through communication 118 via unified communication protocol/hub 102 to wired keyboard 104a or to wireless keyboard 104b, depending on which peripheral devices the user selected.

Wired headset 108a can also receive information through communication 120 via unified communication protocol/hub 102 from wired mouse 106a or from wireless mouse 106b, depending on which peripheral devices the user selected for impending use. Similarly, wired headset 108a can receive information through communication 120 via unified communication protocol/hub 102 from wired keyboard 104a or from wireless keyboard 104b, depending on which peripheral devices the user selected. Further, if the user had selected to use wireless peripheral devices, then once the wireless peripheral devices are configured using unified communication protocol/hub, the wireless peripheral devices can use wireless communication (124, 126, 128) to communicate with each other, according to certain embodiments. The wireless peripheral devices can also use wireless communication (122, 132, 130) to communicate with unified communication protocol/hub 102, according to certain embodiments.

According to certain embodiments, the user can deselect one or more of the previously selected peripheral devices and then proceed to select other peripheral devices for use with unified communication protocol/hub 102. For example, the user may select a gaming mouse with special MMO features (or a mouse with a specific DPI range) over other types of mouse depending on what video game that the user is about to play, for example. The user has the option of selecting yet another type of mouse (and/or keyboard and/or headset) when the user decides to play a different video game. The use-scenarios are not restricted to playing video games. The user may select computer peripherals based on the user's preferences or based on the type of project on which the user is about to embark.

Figure 2:
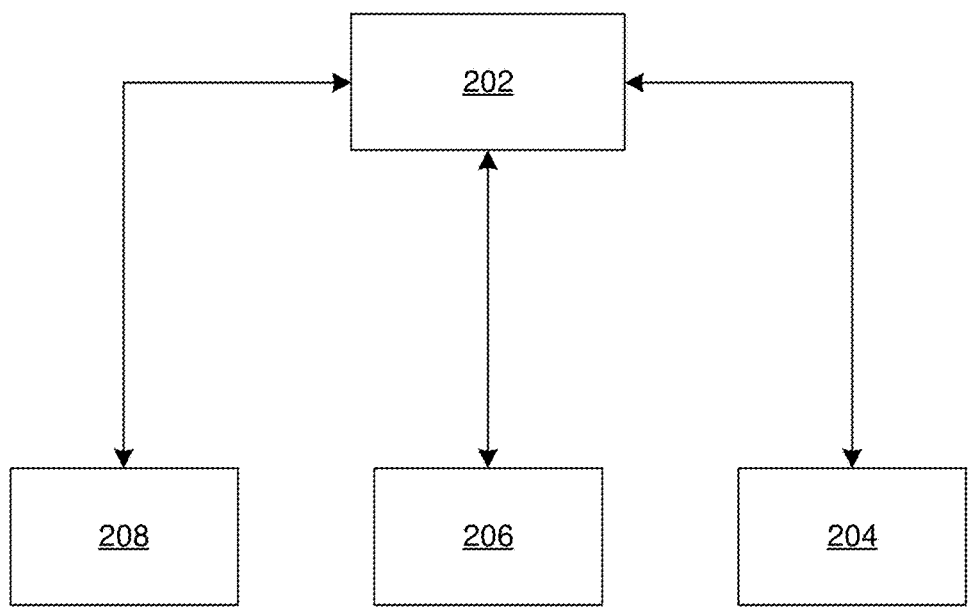
FIG. 2 illustrates some examples of assignment of functions from one peripheral device to another, according to certain embodiments.

FIG. 2 illustrates some examples of assignment of functions from one peripheral device to another, according to certain embodiments. FIG. 2 shows host machine 202, a headset 204, a mouse 206 and a keyboard 208. Assume that hosts machine 202 hosts the unified communication protocol/hub. Further assume that headset 204, mouse 206 and keyboard 108 are associated with the unified communication protocol/hub. For purposes of explanation, assume that keyboard 208 and mouse 206 in FIG. 2 are wired devices and that headset 204 is a wireless headset. Examples 1, 2 and 3 below are described with reference to FIG. 2.

Example 1

A headset 204 function that is selected by the user is to be controlled by another peripheral such as keyboard 208. The unified communication protocol/hub at host 202 is used to make a trigger key assignment on keyboard 208. As a non-limiting example, the alphabet letter "M" key on keyboard 208 is assigned to be the trigger key to control the microphone on headset 204. For example, by toggling the "M" key, the microphone on headset 204 can be turned on or off. As another example, the "M" key can be assigned to turn the microphone "on" while another key (e.g., "N" key) on keyboard 208 can be assigned to turn the microphone "off".

Example 2

A headset 204 function, such as headset volume, can be selected by the user to be controlled by another peripheral such as mouse 206. The unified communication protocol/hub at host 202 is used to make a trigger key assignment on mouse 206. As a non-limiting example, the "sniper" button and scroll wheel on mouse 206 are jointly assigned to control the volume level on headset 204. For example, by pressing the "sniper" button and rotating the scroll wheel on moue 207, the volume level on headset 204 can be increased or decreased.

Example 3

A lighting effect of keyboard 208 and mouse 206 can be selected by the user to be controlled by another peripheral. For example, the lighting effect of keyboard 208 and mouse 206 can be synchronized with the lighting effects of headset 204. The unified communication protocol/hub at host 202 is used to make a trigger key assignment on headset 204. As a non-limiting example, the volume button on headset 204 is assigned to initiate a custom lighting pattern across several peripheral devices (a user can customize the lighting pattern using unified communication protocol/hub at host 202). For example, by pressing and holding the volume button on headset 204, a custom lighting pattern (e.g., rainbow pattern) can be initiated across all three peripheral devices (for example, keyboard 208, mouse 206, and headset 204).

Figure 3:
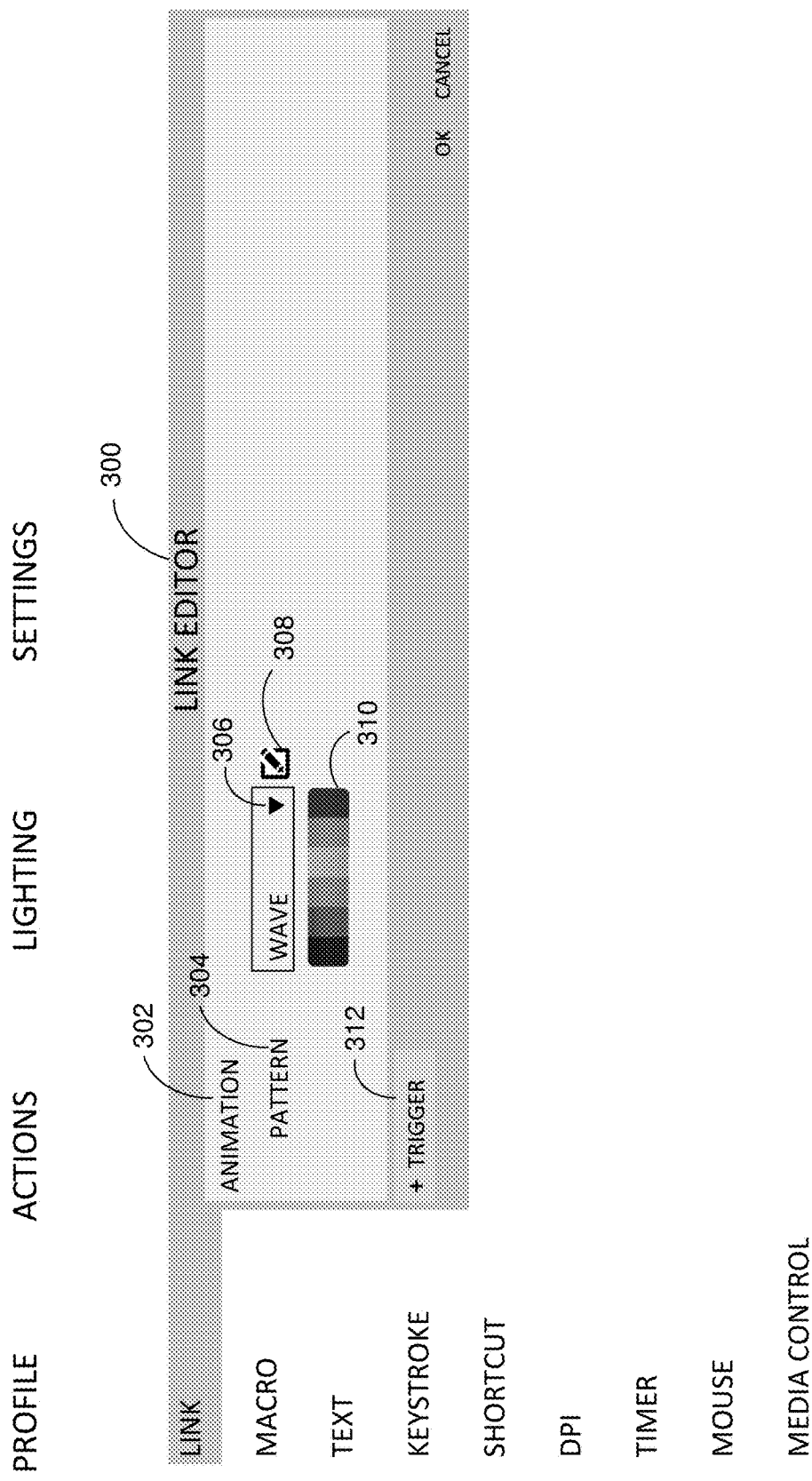
FIG. 3 illustrates a sample user interface of the unified communication protocol/hub, according to certain embodiments.

FIG. 3 illustrates a sample user interface of the unified communication protocol/hub, according to certain embodiments. FIG. 3 shows an editor 300 that links one or more actions/functions of one peripheral device to other peripheral devices. For purposes of explanation, FIG. 3 to FIG. 9 illustrate the control and assignment of the "animation" action/function using a user interface. However, the embodiments are not restricted to the "animation" action/function and can include various actions/functions associated with each peripheral device. Some of the actions/functions associated with each peripheral device and that can be controlled and assigned are previously listed herein. The actions/functions that are assignable can vary from implementation to implementation.

FIG. 3 shows that a user can use editor 300 to control animation action 302 by selecting a pattern 304 (e.g., wave pattern, ripple pattern, solid pattern, gradient pattern) for the animation. For example, a user can select a pattern from a drop down menu 306 to select a wave pattern. The user can further customize the animation by selecting the edit option 308. Non-limiting examples of features that can be customized include color (user can select various colors 310 that make up the pattern), speed, direction, intensity, duration, etc., of the animated pattern. In this case, rainbow colors 310 is selected. The patterns and customizable features can vary from implementation to implementation.

FIG. 3 further shows a "trigger" assignment option 312 for the selected and customized animation. The "trigger" assignment is further described herein with respect to FIG. 5 and FIG. 6. According to certain embodiments, if there is no trigger assignment, the animation is global across all connected peripherals by default.

Figure 4:
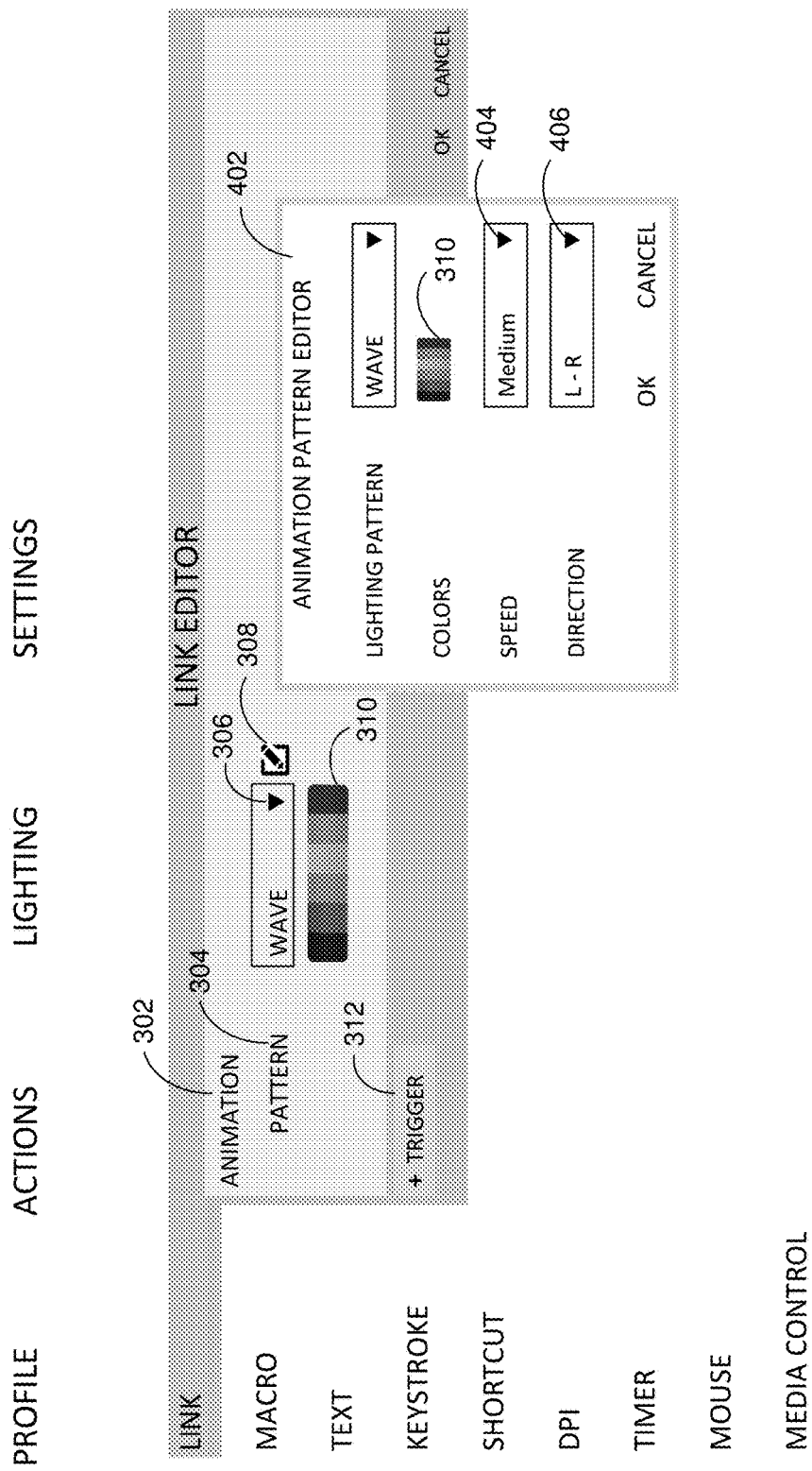
FIG. 4 illustrates a sample animation editor to allow a user to customize the animation, according to certain embodiments.

FIG. 4 illustrates a sample animation editor 402 to allow a user to customize the animation when the user uses the edit option 308, according to certain embodiments. Animation editor 402 enables the user to select colors 310, select the speed 404 of the animation and direction 406 of the animation, as non-limiting examples.

Figure 5:
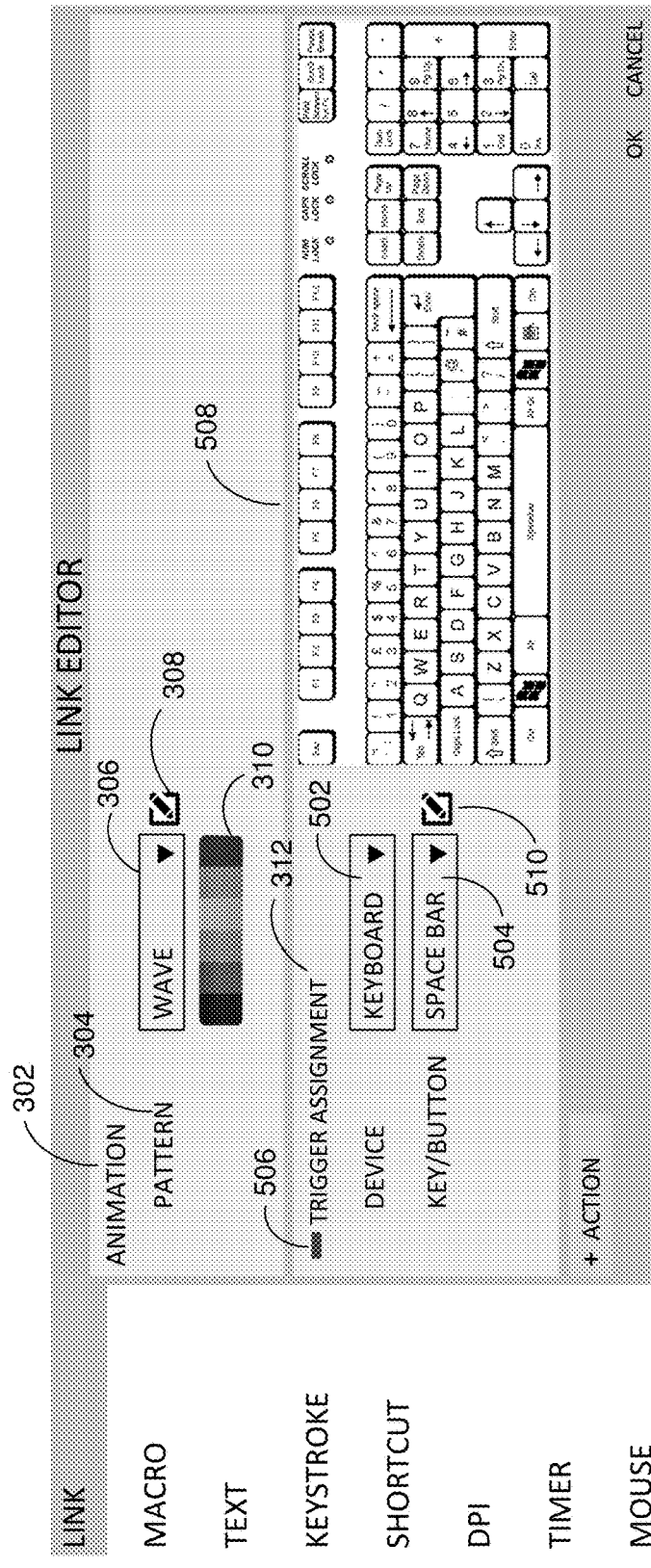
FIG. 5 illustrates a sample trigger assignment interface, according to certain embodiments.

FIG. 5 illustrates a sample trigger assignment interface 312 that enables the user to select a device 502 and the key/button 504 on the selected device, according to certain embodiments. Such key/button 504 will be used to trigger the actions/functions (in this example, the action/function is animation) described with reference to FIG. 3 and FIG. 4. As an option, the trigger assignment interface 312 may include a visual display 508 of the selected device in order to help the user select the key/button for use as a trigger. Key/button 504 may be optionally customized using the edit option 510. The trigger assignment can be removed by clicking on the minus sign 506, as an example. The symbols of FIG. 2 to FIG. 9 are merely examples. The embodiments are not restricted to such symbols and the symbols can vary from implementation to implementation.

Figure 6:
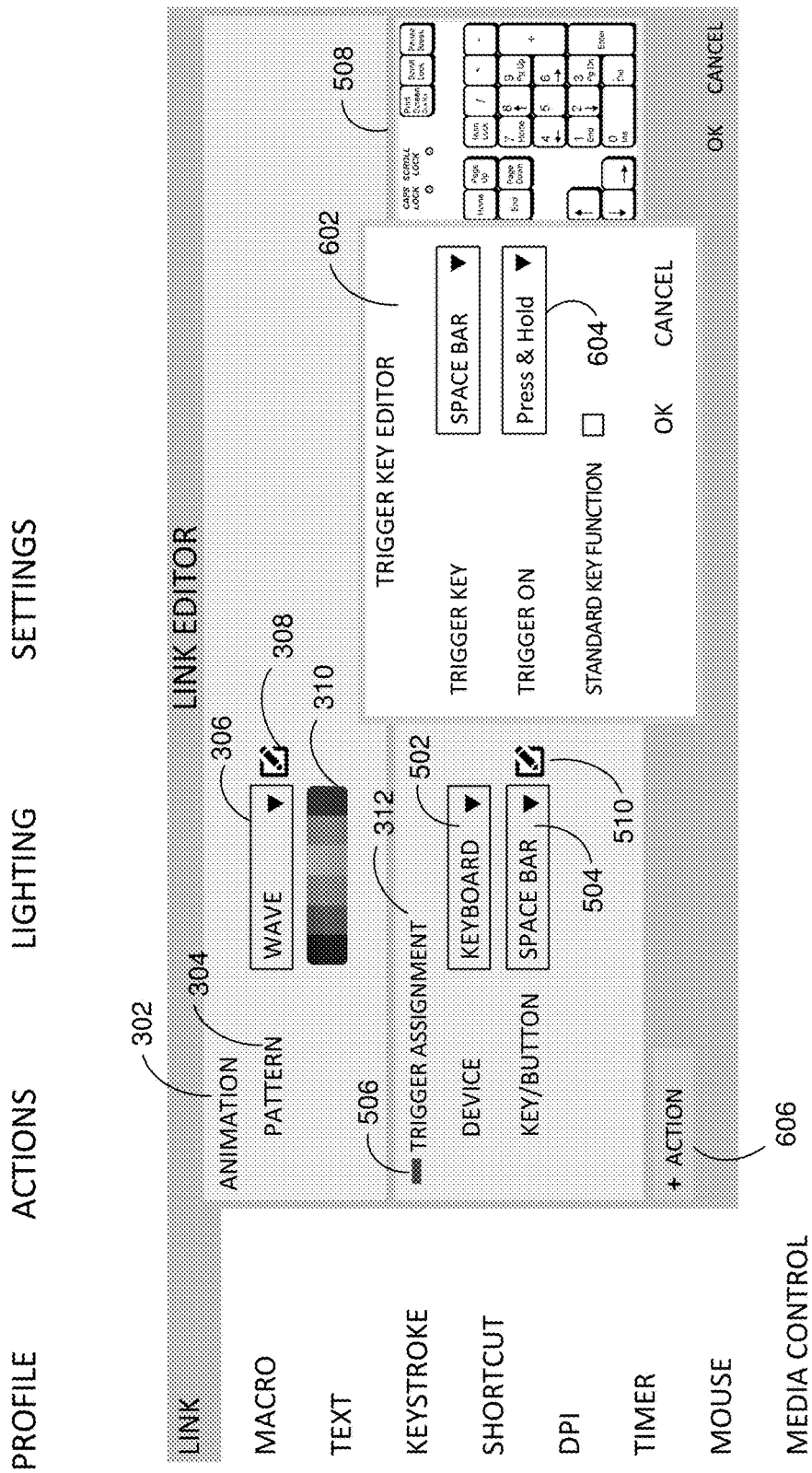
FIG. 6 illustrates a trigger key editor, according to certain embodiments.

FIG. 6 illustrates a trigger key editor 602, according to certain embodiments. Trigger key editor 602 enables a user to customized the trigger key using a drop down menu 604. The user interface of FIG. 6 also shows an option to integrate more actions 606 to be associated with the selected trigger key.

Figure 7:
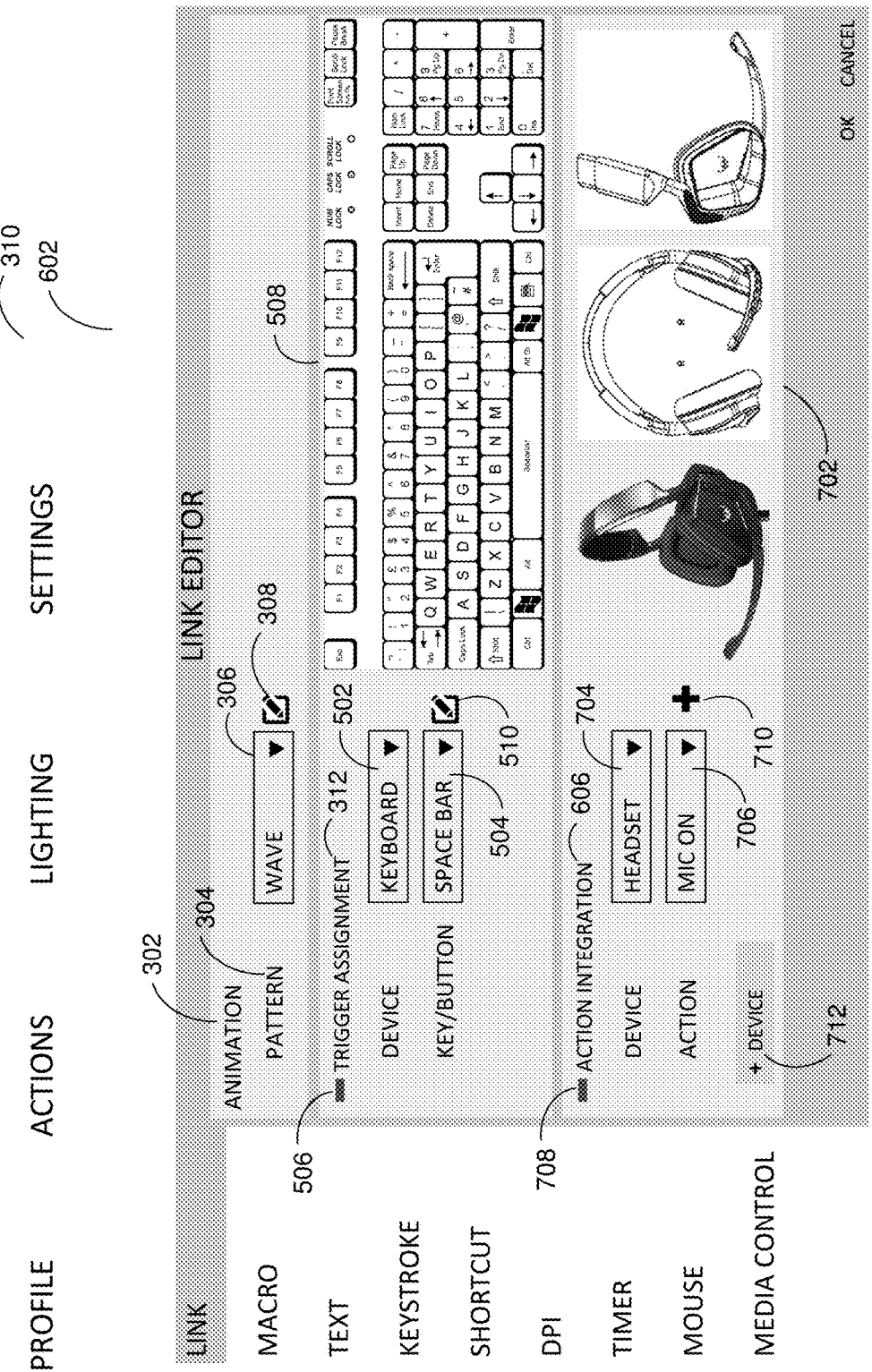
FIG. 7 illustrates some details of action integration, according to certain embodiments.

FIG. 7 illustrates some details of the action integration 606, according to certain embodiments. FIG. 7 shows that the user can add another device from pull down menu 704 and select an action/function from pull down menu 706 of the device selected at 704. Such a selected action/function (706) is in addition to the animation action that will be triggered by the selected trigger as described herein with respect to FIG. 5. The user interface may optionally present a visual display 702 of the selected device. The user may remove the action integration by clicking on the minus symbol 708. The user may optionally add another action/function for integration by clicking on the add symbol 710 (also see FIG. 8 herein). The user interface may enable the user to add more devices 712 and associated actions for integration with the trigger key.

Figure 8:
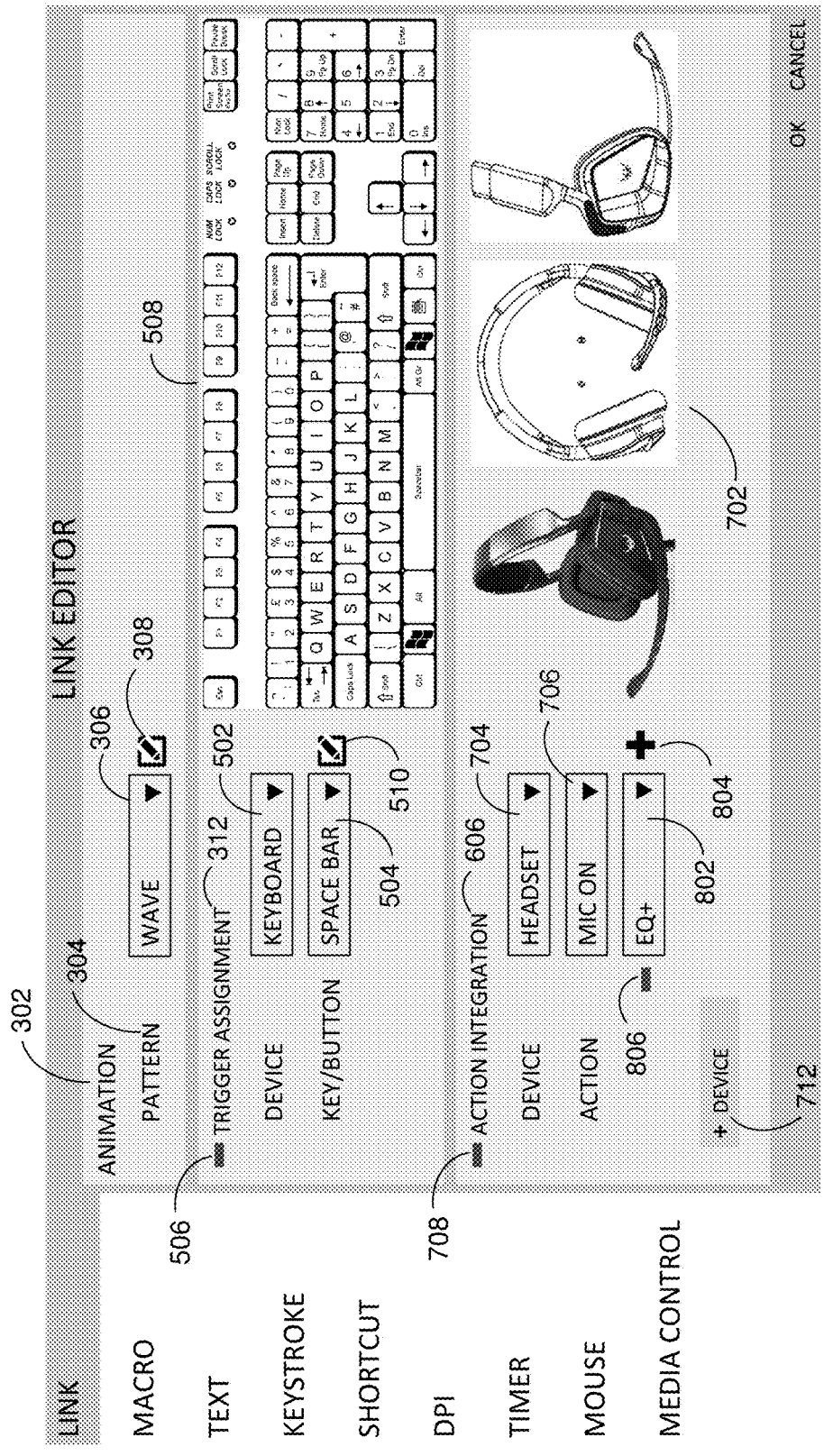
FIG. 8 illustrates the addition of further actions/functions for integration with the selected trigger, according to certain embodiments.

FIG. 8 illustrates the addition of further actions/functions for integration with the selected trigger as described herein with respect to FIG. 5, according to certain embodiments. FIG. 8 shows that a user can add another action/function at 802 for integration. The action/function at 802 can be removed by clicking on the minus symbol 806. More action/functions can be added by clicking on the add symbol 804.

Figure 9:
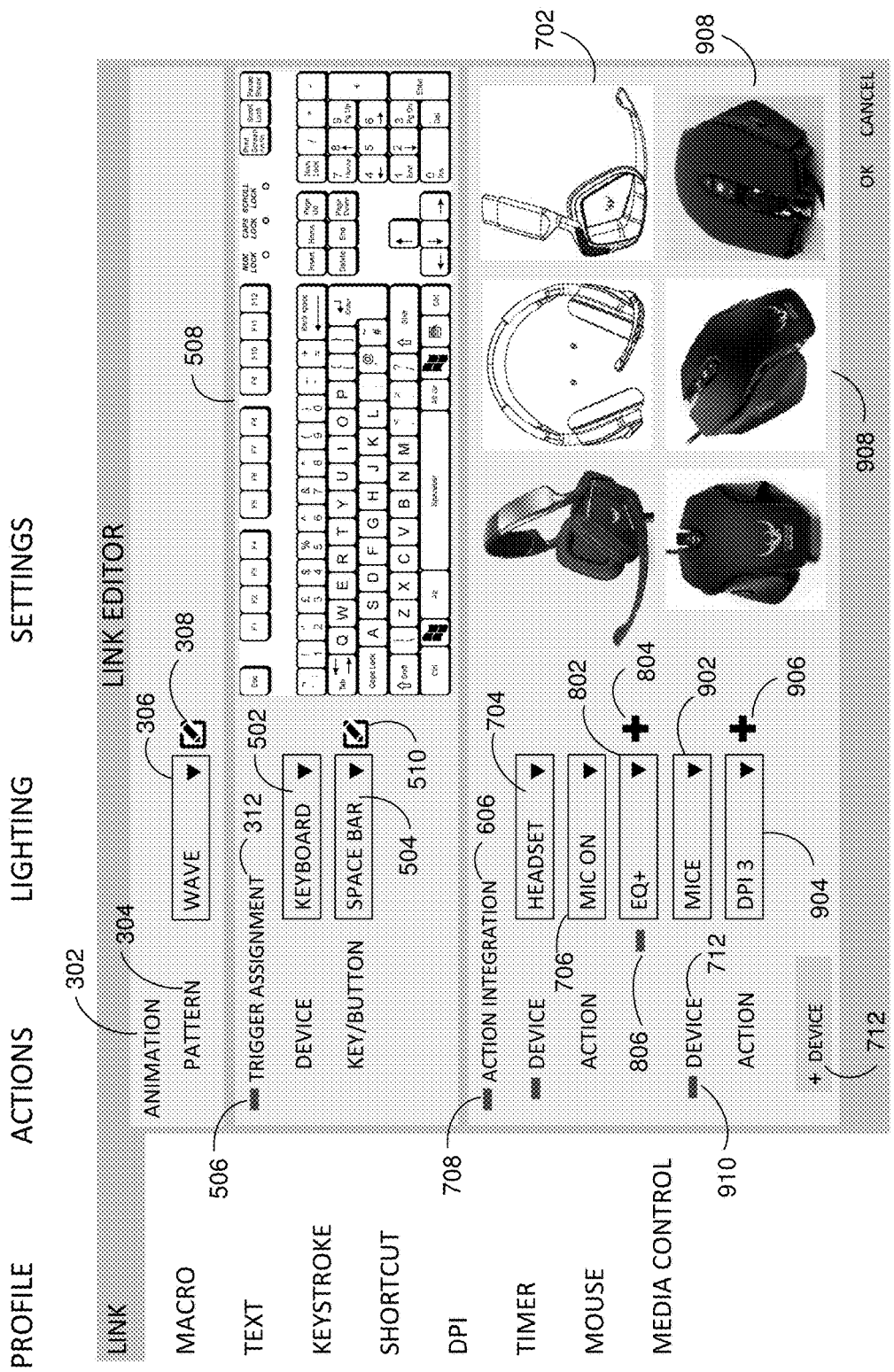
FIG. 9 illustrates the addition of further devices and associated actions/functions for integration with the selected trigger, according to certain embodiments.

FIG. 9 illustrates the addition of further devices (see 712 of FIG. 7) and associated actions/functions for integration with the selected trigger as described herein with respect to FIG. 5, according to certain embodiments.

FIG. 9 shows that the interface allows the user to add another device for integration using a drop down menu 902, according to certain embodiments. The user interface may optionally present a visual display 908 of the selected device. The selected device of 902 can be removed by clicking on the minus symbol 910. An action/function for integration and that is associated with the device selected at 902 can be selected from a drop down menu 904. The user can add another action/function for integration by clicking on the add symbol 906.

Figure 10:
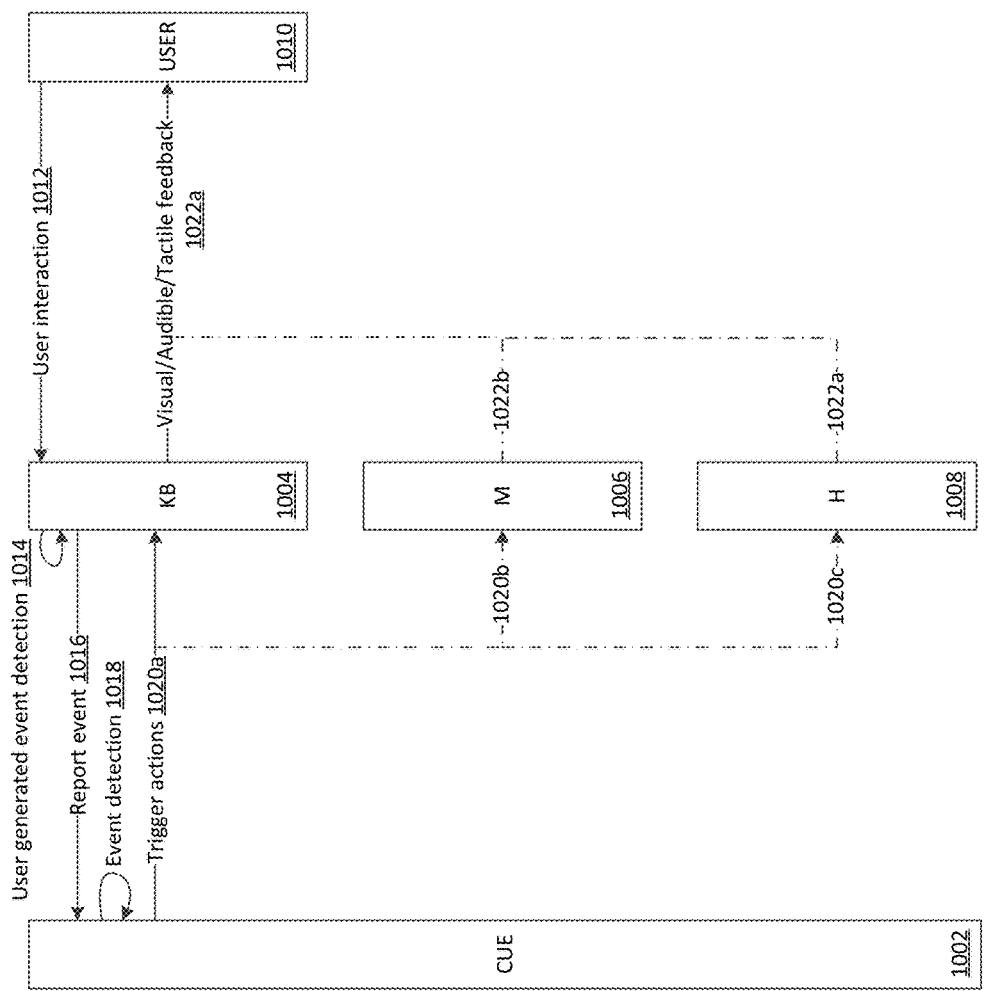
FIG. 10 is a high-level timing diagram that shows the flow of communication, in response to a user-generated event, between devices that are associated with the unified communication platform, according to certain embodiments.

FIG. 10 is a high-level timing diagram that shows the flow of communication, in response to a user-generated event, between devices that are associated with the unified communication platform, according to certain embodiments. FIG. 10 shows a unified communication protocol/hub 1002 (hosted on a computer, for example), peripheral devices such as a keyboard 1004, a mouse 1006, a headset 1008 and a user 1010, according to certain embodiments. As a non-limiting example, when user 1010 interacts (1012) with keyboard 1004, firmware and/or software of keyboard 1004 detects (1014) such user interaction as a user-generated event. The peripheral device's firmware/software reports (1016) the user-generated event to the unified communication protocol/hub 1002. According to certain embodiments, the unified communication protocol/hub 1002 detects (1018) the reported user-generated event by triggering one or more pre-defined actions (1020a, 1020b, 1020c) on one or more of the peripheral devices that are associated with the unified communication platform. According to certain embodiments, the triggered one or more pre-defined actions (1020a, 1020b, 1020c) on the one or more respective peripheral devices provide one or more types of feedback (1022a, 1022b, 1022c) to user 1010. Feedback (1022a, 1022b, 1022c) can be visual and/or audible and/or tactile. For example, feedback (1022a, 1022b, 1022c) can be lighting effects, sound effects, tactility, key activation force, etc., associated with the peripheral devices used by user 1010.

According to certain embodiments, computer peripheral devices include computer mice, headsets and keyboards, other input/output devices, and human-interface devices.

Figure 11:
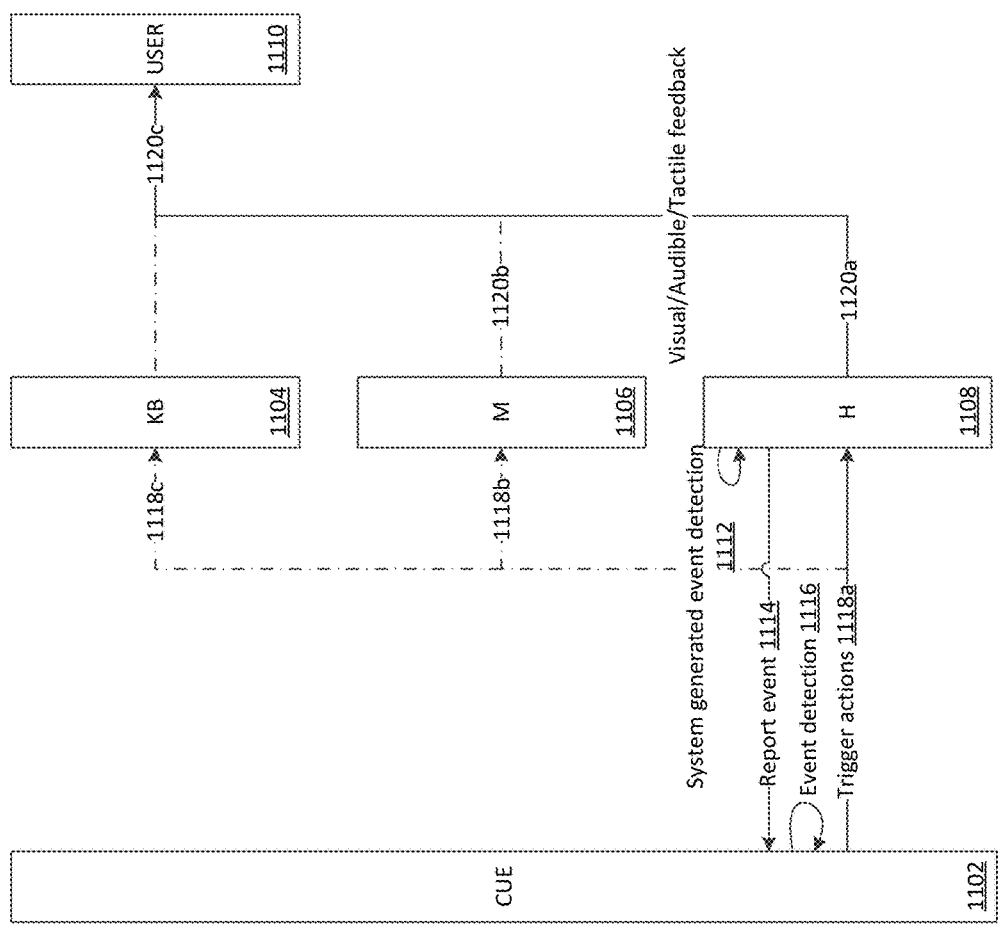
FIG. 11 is a high-level timing diagram that shows the flow of communication, in response to a system-generated event, between devices that are associated with the unified communication platform, according to certain embodiments.

FIG. 11 is a high-level timing diagram that shows the flow of communication, in response to a system-generated event, between devices that are associated with the unified communication platform, according to certain embodiments. FIG. 11 shows a unified communication protocol/hub 1102 (hosted on a computer, for example), peripheral devices such as a keyboard 1104, a mouse 1106, a headset 1108 and a user 1110, according to certain embodiments. As a non-limiting example, firmware and/or software of headset 1108 detects (1112) a system-generated event. Non-limiting examples of system-generated events include low battery charge of peripherals, low (or lack of) wireless signal strength. The peripheral device's firmware/software reports (1114) the system-generated event to the unified communication protocol/hub 1102. According to certain embodiments, the unified communication protocol/hub 1102 detects (1116) the reported system-generated event by triggering one or more pre-defined actions (1118a, 1118b, 1118c) on one or more of the peripheral devices that are associated with the unified communication platform. According to certain embodiments, the triggered one or more pre-defined actions (1118a, 1118b, 1118c) on the one or more respective peripheral devices provides one or more types of feedback (1120a, 1120b, 1120c) to user 1110. Feedback (1120a, 1120b, 1120c) can be visual and/or audible and/or tactile. For example, feedback (1120a, 1120b, 1120c) can be lighting effects, sound effects, tactility, key activation force, etc., associated with the peripheral devices used by user 1110.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A unified computer communication method comprising:
  associating a plurality of computer peripheral devices with a communication hub; and
  using the communication hub to remap a first key of a first computer peripheral device of the plurality of computer peripheral devices to one or more features on a second computer peripheral device of the plurality of computer peripheral devices and simultaneously to one or more features on a third computer peripheral device of the plurality of computer peripheral devices;
  wherein the first computer peripheral device is a keyboard, the second computer peripheral device is a mouse and the third computer peripheral device is a headset; and
  wherein,
    the keyboard can control the mouse and the mouse can control the keyboard;
    the keyboard can control the headset and the headset can control the keyboard; and
    the mouse can control the headset and the headset can control the mouse.

2. The unified computer communication method of claim 1, further comprising using the communication hub to remap the first key of the first computer peripheral device to one or more features on the first computer peripheral device, wherein activating the first key simultaneously triggers the one or more features on the first computer peripheral device, the one or more features on the second computer peripheral device and the one or more features on the third computer peripheral device.

3. The unified computer communication method of claim 1, further comprising using the communication hub to remap a second key of a fourth computer peripheral device of the plurality of computer peripheral devices to the one or more features on the second computer peripheral device, wherein the fourth peripheral device is selected from the group consisting of: a computer keyboard, a computer mouse and a computer headset.

4. The unified computer communication method of claim 1, further comprising using USB communication protocol.

5. The unified computer communication method of claim 1, further including one or more of: controls, lighting effects, actions, functions, and macros as the one or more features associated with the plurality of the computer peripheral devices.

6. The unified computer communication method of claim 1, wherein features associated with the one or more keyboards comprise:
trigger a standard key action;
trigger a customized key action;
trigger a macro;
trigger customized text;
a shortcut key to a program or file;
trigger a button press;
trigger a button press and hold; and
trigger a button release.

7. The unified computer communication method of claim 1, wherein features associated with the one or more computer mice comprise:
a left click;
a right click;
a middle click;
a sniper button;
DPI (dots per inch) Up;
DPI (dots per inch) down;
set DPI level;
scroll up;
scroll down;
a trigger button; and
MIO (massively multiplayer online) keys.

8. The unified computer communication method of claim 1, wherein features associated with the one or more headsets comprise:
microphone on;
microphone off;
mic toggle;
set microphone level;
sidetone on;
sidetone off;
set sidetone level;
surround sound on;
surround sound off;
EQ 1 (equalizer level 1);
EQ 2, (equalizer level 2);
volume up;
volume down;
set volume level;
power on;
power off;
auto shut down on;
auto shut down off;
standby;
RGB LED pattern enabled;
RGB LED pattern disabled;
and customize RGB LED pattern.

9. The unified computer communication method of claim 1, further comprising:
receiving, by the communication hub, information on a system-generated event from one or more computer peripheral devices of the plurality of computer peripheral devices; and
in response to receiving the system-generated event, triggering one or more pre-defined actions on one or more corresponding computer peripheral devices.

10. The unified computer communication method of claim 1, further comprising:
receiving, by the communication hub, information on a user-generated event from one or more computer peripheral devices of the plurality of computer peripheral devices; and
in response to receiving the user-generated event, triggering one or more pre-defined actions on one or more corresponding computer peripheral devices.

* * * * *